(No Model.) 3 Sheets—Sheet 1.

N. NILSON.
AUTOMATIC WEIGHING SCALE.

No. 476,810. Patented June 14, 1892.

Witnesses:
J. Jensen
C. F. Hawley

Inventor.
Nils Nilson
By Paul A. Merwin attys

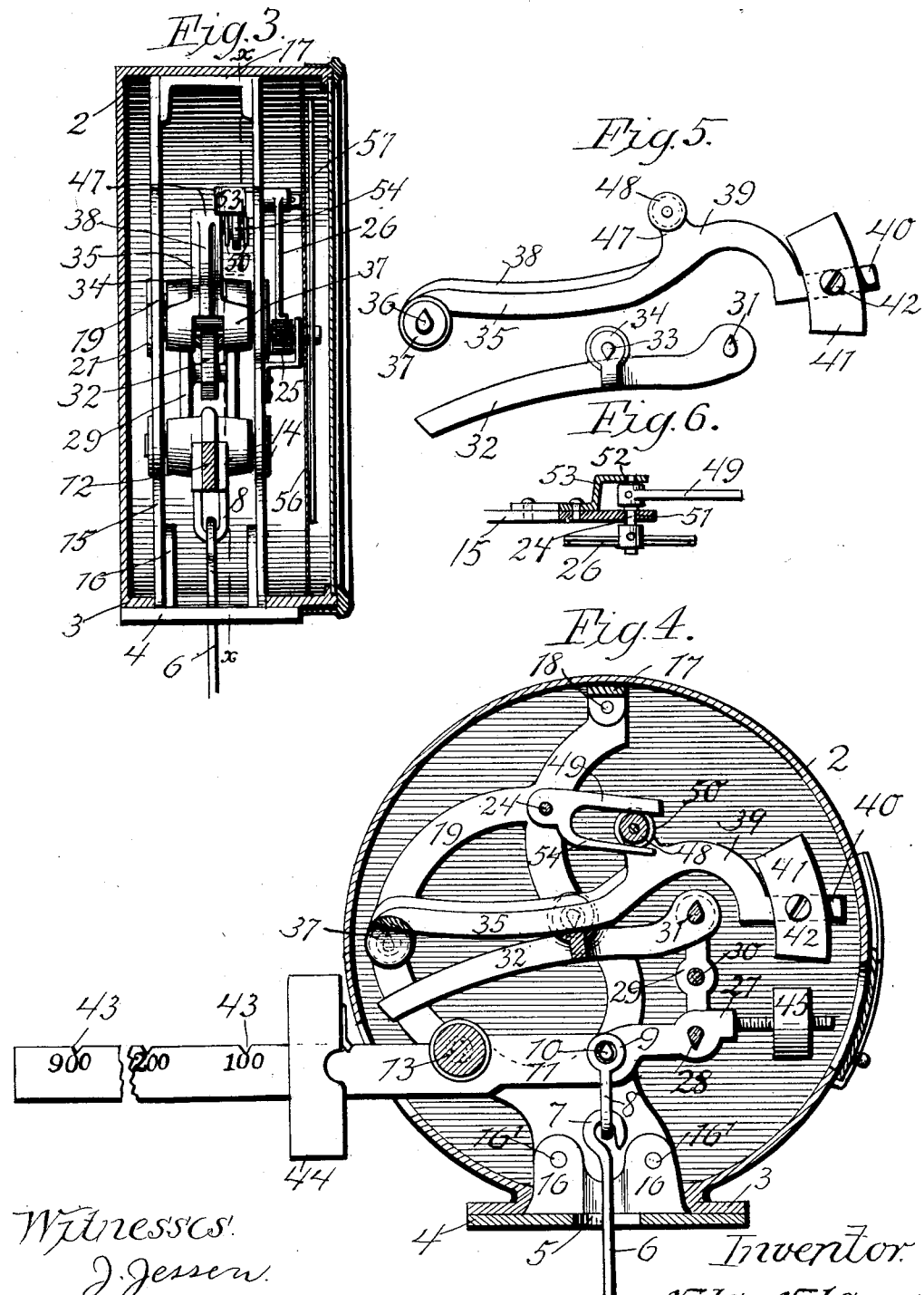

(No Model.) 3 Sheets—Sheet 3.
N. NILSON.
AUTOMATIC WEIGHING SCALE.
No. 476,810. Patented June 14, 1892.
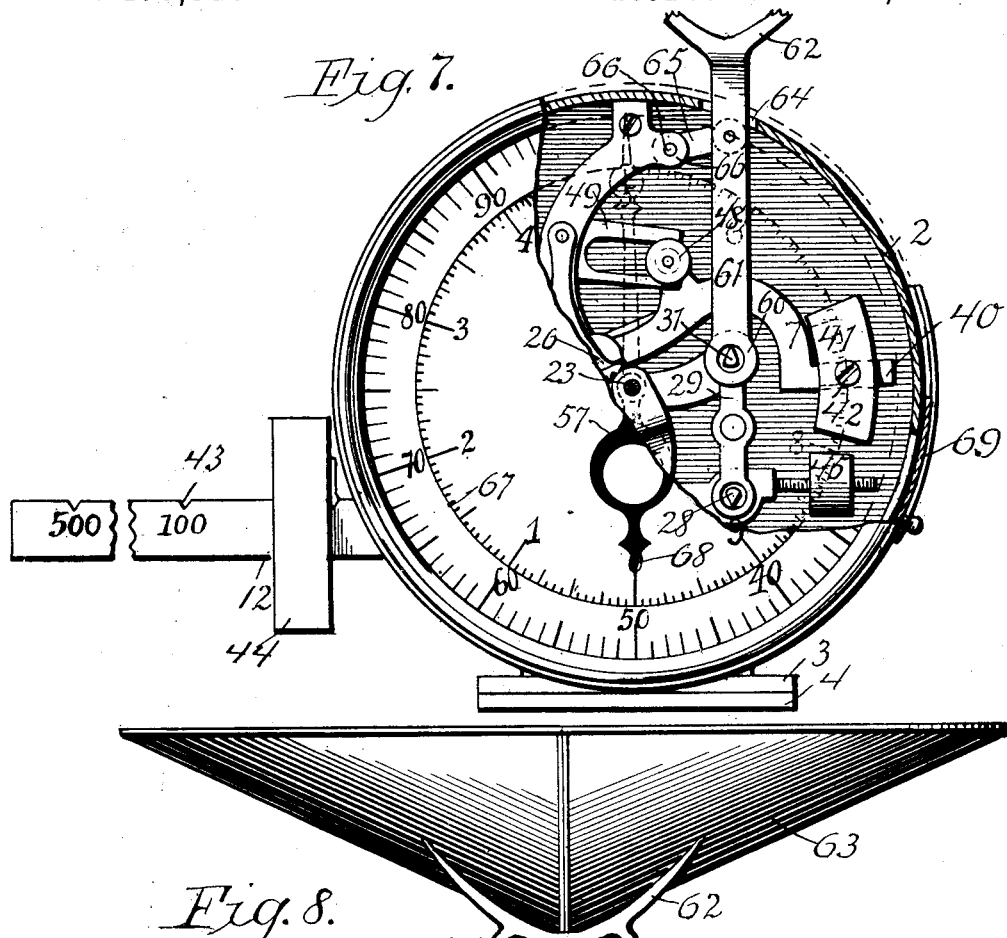
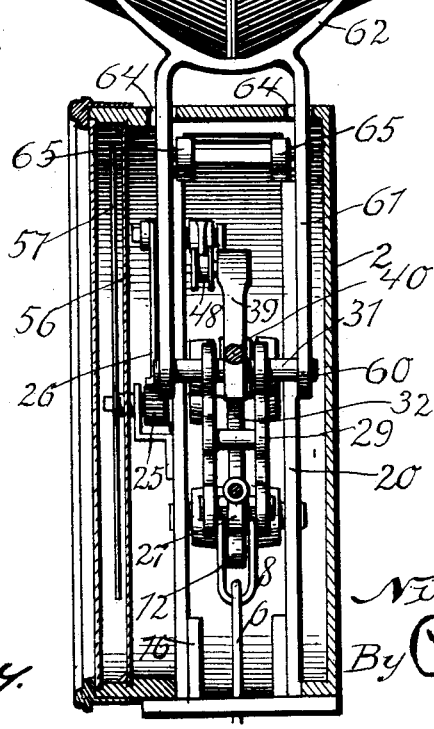
Witnesses
J. Jensen
G. Hawley
Inventor
Nils Nilson
By Paul A. Merwin
Att'ys

UNITED STATES PATENT OFFICE.

NILS NILSON, OF MINNEAPOLIS, ASSIGNOR OF ONE-FOURTH TO EDWARD F. QUACKENBUSH, OF LE SUEUR, MINNESOTA.

AUTOMATIC WEIGHING-SCALE.

SPECIFICATION forming part of Letters Patent No. 476,810, dated June 14, 1892.

Application filed December 1, 1891. Serial No. 413,677. (No model.)

*To all whom it may concern:*

Be it known that I, NILS NILSON, of Minneapolis, in the county of Hennepin and State of Minnesota, have invented certain Improvements in Automatic Weighing-Scales, of which the following is a specification.

My invention relates to automatic weighing-scales, and especially to a scale attachment adapted to be placed on the standard of any of the ordinary weighing-scale devices; and it relates especially to an attachment for indicating the fractions of the established units indicated upon the scale-beam.

The objects of my invention are to provide a cheaper device than has heretofore been invented and a scale device which will occupy a small amount of space and will be exceedingly sensitive in its action.

To this end my invention consists in the combination, with the scale-beam and the draw-rod, by means of which the weight is applied thereto, of two rocking jaws pivoted at opposite ends to one another and arranged to make a rolling contact with one another, of the same connected with the short end of said beam and the other provided with a weight and means for indicating upon a dial the movement of said jaws or levers, and thereby the weight, in a special indicator, and in various other constructions and combinations, all as hereinafter described, and particularly pointed out in the claims.

My invention will be more readily understood by reference to the accompanying drawings, in which—

Figure 1:
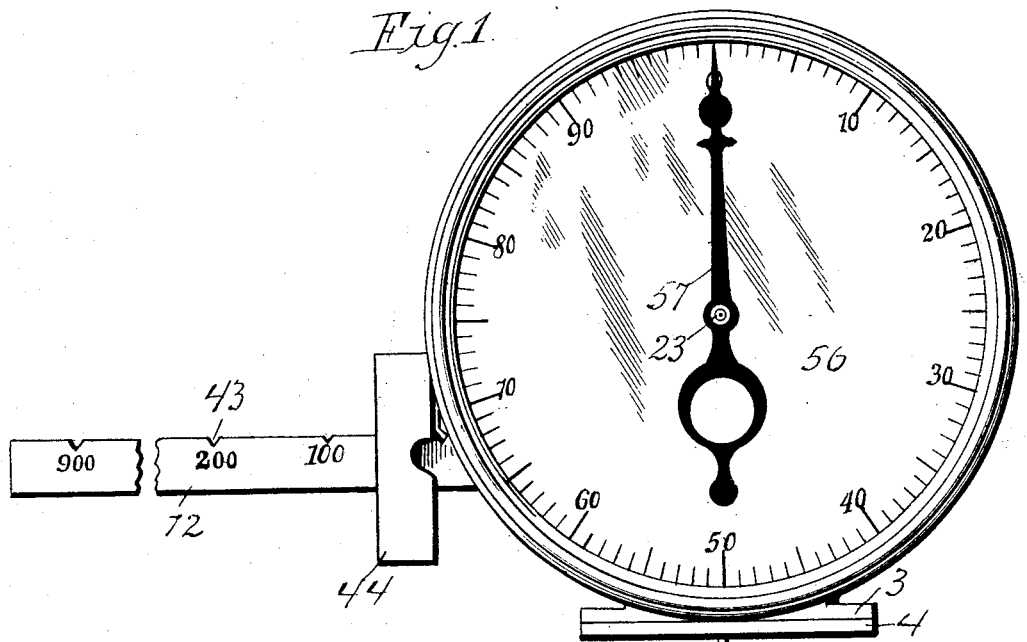
Figure 2:
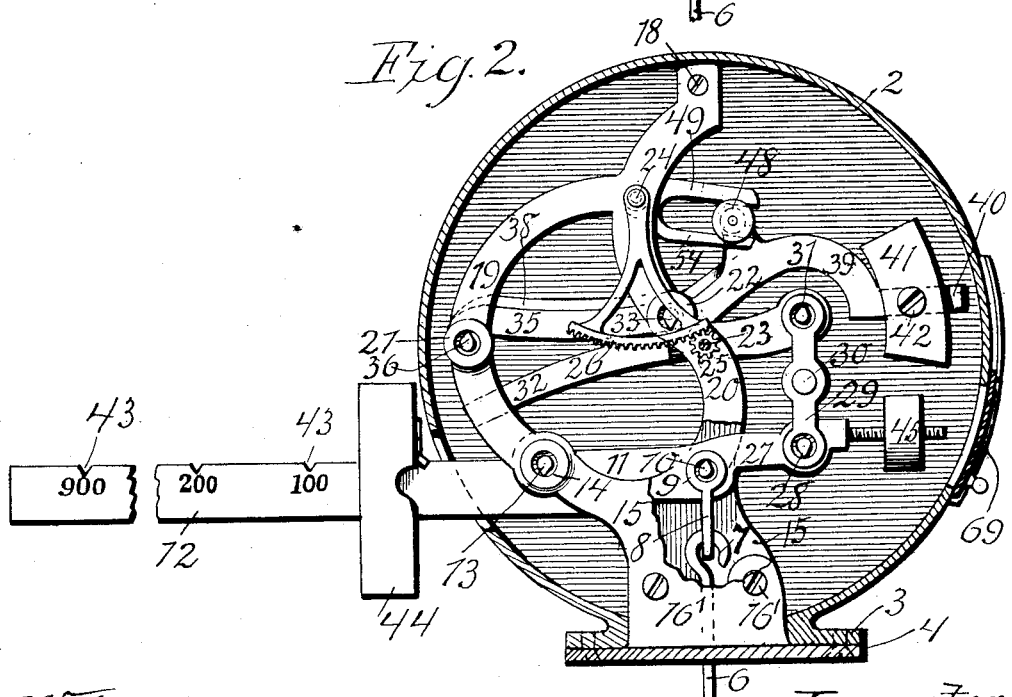

Figure 1 is a front elevation of one of my scales, the scale-beam being broken away, so as to show both ends thereof. Fig. 2 is a transverse sectional view through the case of the device, the inner parts of the scale being shown in full. Fig. 3 is a longitudinal elevation, the case alone being sectioned. Fig. 4 is a transverse section on the line *x x* of Fig. 3. Fig. 5 shows the two levers or jaws removed from the case and separated from one another. Fig. 6 is a detail of the quadrant and arm connected with the dial-pointer. Fig. 7 is a front elevation of a scale having a scoop attachment, the front of the case being partly broken away. Fig. 8 is a longitudinal section thereof, showing the scoop in position.

In the drawings, 2 represents the case in which the weighing apparatus is inclosed and which in ordinary sizes of scales is from six to nine inches in diameter. The case is provided with the base 3, adapted to rest upon the top plate 4 of the scale-standard, both being provided with holes 5 (see Fig. 4) to receive the draw-rod 6. This draw-rod is provided with the hook 7, which engages the link 8, having the eyes 9, swung upon the knife-edges 10 of the short end 11 of the scale-beam 12. The scale-beam is sensitively pivoted by means of the knife-edges 13 thereof resting in the bearings 14, arranged in the two frame-castings 15. (See Figs. 2 and 3.) These frame-castings are secured upon the base 4 by the vertical lugs 16 thereof, to which said frames are fastened by the screws 16'. The upper ends of the frame-pieces are secured by the bracket-piece 17, to the lugs of which the frames are fastened by screws 18.

The frame is made of the two principal and integral parts, each provided with the forwardly-curved portion 19 and the ogee-curved portion 20, the bearings 14 and 21 being provided in the first and the bearings 22 in the second. The latter also have bearings for the shafts 23 and 24 of the indicator-pinion 25 and the quadrant 26, respectively. An extension 27 of the short arm 11 of the scale-beam is provided with the knife-edges 28, which engage the lower end of the two-part link 29, the parts of which are secured together by the shouldered rivet 30. The upper end of the link engages the knife-edges 31 on the short end of the lever 32, which in turn has the knife-edges 33 on its lug 34, and which rests in the bearings 22. The long arm of this lever 32 is formed in the curve shown, which curve is the true arc of a circle having for its radius a span about six times as great as the distance between the bearings 21 and 22. On the upper edge or curved surface of the lever 32 rests the other curved lever or jaw 35, having its lower edge formed in an equivalent arc and having its forward end pivoted in the bearing 21 by means of the knife-edges 36, provided on the lug 37 on the end of said lever 35. The lever 35 is strengthened by the rib 38, formed on its upper edge, and further, it is provided with the upwardly curved or branched free end 39, the extreme end of which consists in the spindle 40, whereon the counterpoise-weight 41 is fixed by the set-screw 42. The end 40 of the lever 35 is normally in the same horizontal plane as the bearings of the two levers or jaws.

The scale-beam 12 is provided with the usual graduations or notches 43 and counterpoise 44. The counter-balance 45 is adjustable on the threaded end of the scale-beam, whereby an accurate balance of scale may be had. Now it will be seen that when a weight or pull is exerted on the draw-rod 6 that the short end of the scale-beam will be depressed, thereby throwing up the long arm of the lower curved lever or jaw 32, which in its movement rolls upon the surface of the upper lever and lifts the same, the weight on the scale-platform overbalancing the multiplied weight of the lever 35 and the counterpoise 41 thereon. It will be seen that the accurate and proportionate movement of the upper lever will give the weight of the body upon the scale-platform. I measure this movement by the means shown most clearly in Figs. 2, 3, and 4. The lever 35 is provided with the lug 47, upon which is secured the small friction roller or pulley 48, normally adapted to engage the arm 49, and is prevented from slipping off the same by flanges 50 on the pulley. The arm 49 is fastened on the shaft 24, upon which the quadrant 26 is also secured. This shaft is journaled in the bearings 51 and 52, provided in the frame, and in the bracket 53, secured thereon, Fig. 6. The quadrant is adapted to engage the pinion 25 and normally stands in the position shown in Fig. 2. The arm 54 is arranged on the main arm 49 and extends beneath the friction-roller 48, which, however, does not usually touch the same. The office of this arm is to insure the return of the quadrant and the pointer when the weight is removed from the scale-platform, whereupon the lever 35 falls and the friction-roller engages the lower arm 54, thereby returning the main arm 49 and the quadrant-gear 26. On the face of the graduated dial 56 is the pointer 57, fastened upon the forward end of the pinion-shaft 23 and adapted to revolve with the same. There will be a double increase of leverage or purchase between the levers or jaws 32 and 35 as the latter is raised by the former. To compensate for this and exactly proportion the movement of the pointer on the dial is the office of the arm 49, which is obvious, for a given movement or throw of the lever 35 moves through a gradually-increasing distance as the friction-roll nears the pivot-center of the arm 49.

I may adapt my scale for use with a scoop, as shown in Figs. 7 and 8. The knife-edge bearings 31 are long enough to engage the bearings 60, provided in the lower ends of the scoop-frame 61, having the prongs 62, upon which the scoop or pan 63 is adapted to rest. The legs of the scoop-frame extend down through the openings 64 in the case 2, and are pivotally secured in the vertical position by means of the short links 65, which are in turn pivoted on the lugs 66, arranged on the upper end of the scale-frame. A weight placed in the scoop, it will be seen, is applied to the lever 32 with greater advantage than the weight suspended on the draw-rod 6. Hence it becomes necessary to arrange a second dial or set of marks 67 upon the dial-face of the machine and another pointer. The pointer shown in Fig. 1 is adapted for such a device by adding the short indicator-point 68, adapted to travel over the second set of figures on the dial. Access may be had to the inside of the case to adjust the counter-balance 45 through the slide-door 69.

The machine which I have illustrated is adapted for weighing up to one thousand pounds, the scale-beam 12 being marked from one hundred to nine hundred. The last hundred of the thousand will be indicated on the dial. Suppose that the sliding counterpoise 44 was at the zero-point on the beam and that it was desired to weigh seventy pounds of material. The material being placed on the platform of the scale, the pointer 57 would be revolved on the dial 56 to the point "70" thereon, the scale-beam 12 being thrown up to nearly its full swing, the maximum swing being reached when the short arm of the scale-beam is pulled down far enough to revolve the pointer to the "100" mark on the dial after it has made a complete revolution. In case the body to be weighed weighs approximately two, three, or four hundred pounds, the sliding weight 44 would be moved to such a point on the scale-beam, and the fractions over and above the weight shown on the beam would be indicated on the dial, registering the weight as, say, three hundred and forty-seven pounds, the "300" being shown on the scale-beam by the position of the poise and the "47" indicated by the position of the pointer on the dial.

It is obvious that the pointer might be made stationary and the dial revoluble and other slight modifications made without departing from my invention, and I do not therefore confine myself to the exact construction shown and described.

Having thus described my invention, I claim as new and desire to secure by Letters Patent—

1. In a weighing-scale, the combination of the scale-beam with a draw-rod pivotally connected with the short arm thereof, a curved lever pivoted at an intermediate point and having one of its arms or ends linked to the short arm of the scale-beam, a second and similarly-curved lever pivoted at one end and having its free end overhanging the first, and indicating means in connection with one of said levers, substantially as described.

2. The combination, in a weighing-scale, of two identically-curved levers, the first pivoted at a point between its ends, the second pivoted at one of its ends and opposite the free curved end of the other, the curve of each lever being identical with that of the other and a true arc of a circle, and indicating means in connection therewith, substantially as described.

3. The combination, in a weighing-scale, of a lever pivoted at a middle point and having a downwardly-curved arm, the curved surface thereof being a true arc of a circle, a second lever having a correspondingly-curved edge adapted to make a rolling contact on the other, said lever pivoted at one end and having its free end overhanging the first, a weight on said free end, means for applying the force or weight to be measured to the end of the first lever opposite the curved end thereof, and means for indicating said weight, substantially as described.

4. The combination, in a weighing-scale, of a frame with a lever 32, pivoted in bearings provided therein, a lever 35, pivoted at an opposite point and at one of its ends and having a weighted free end, a dial, a pointer arranged thereon, a pinion connected therewith, a quadrant for operating the same, an arm 49, arranged in connection with said quadrant, and a projection on the free end of the lever 35 to engage said arm, all substantially as described.

5. The combination, in a weighing-scale, of a frame, with a scale-beam pivoted therein, a draw-rod connected with the short arm of the same, a curved lever 32, pivoted at an intermediate point, a lever 35, oppositely pivoted and having its curved surface in contact with that of the lever 32, a link pivotally connecting the short arm of the scale-beam with the lever 32, a dial, and a pointer therefor, a pinion connected therewith, a quadrant-gear to engage said pinion, an arm arranged in connection with said quadrant, and a projection provided on the free end of the lever 35 to engage said arm, whereby as said lever is raised said arm will be operated to move said quadrant, as and for the purposes specified.

6. The combination of a frame with a scale-beam pivoted therein, a draw-rod connected with the short arm of the scale-beam, a sliding counterpoise arranged on said scale-beam, similarly-curved levers 32 and 35, pivoted, respectively, in bearings 22 and 21, a pinion, a quadrant engaging the same and secured upon a short shaft, an arm extending from said shaft, a projection on the lever 35 to engage said arm, a link pivotally connecting the short arm of the scale-beam with the short arm of the lever 32, said lever 35 having its free end weighted, and an indicating device in connection with said pinion, substantially as described.

7. The combination, in a weighing-scale, of a frame, a scale-beam pivoted therein, a draw-rod in connection therewith, curved levers, one pivoted at a middle point and the other pivoted at its end, a link connecting the first with the scale-beam, a shaft, an arm 49, rigidly secured thereon, the projection on the second curved lever to engage said arm, an indicating mechanism arranged in connection with said shaft, and a scoop-frame pivotally connected with said first lever, substantially as and for the purpose specified.

8. The combination, in a weighing-scale, of a frame, a curved lever 32, having a short arm provided with knife-edges 31, and also provided with knife-edges 33, bearings 22 for the same in said frame, a lever 35, having a portion curved to correspond with the curve of the first lever and provided at one end with bearings in said frame, the free end of said lever 35 being weighted and provided with a friction-roll projection, an arm 49, pivoted on a shaft 24, journaled in said frame, said arm adapted to engage said projection, an indicating device in connection with said shaft to be operated thereby, a scoop-frame provided with end bearings 60 to engage said knife-edges 31, and means for holding said scoop-frame in a free vertical position, substantially as described.

9. The combination, with the frame provided with a base 4 and having the simple and the ogee curved portions 19 and 20, of bearings 14, 21, and 22, arranged therein, the scale-beam pivoted in the first and the levers 35 and 32, pivoted, respectively, in the bearings 21 and 22, said levers provided with engaging curved surfaces, a link 29, pivotally connecting said scale-beam and the lever 32, a draw-rod connected with said scale-beam, a sliding counterpoise on said beam, said beam marked with the units-weights, a dial marked with fractional weights, a pointer thereon, a pinion in connection therewith, a quadrant to engage the same and arranged on a shaft 24, an arm 49, extending therefrom, a projection on the lever 35 to engage said arm, the end 39 of said lever provided with a weight 41, a case 2, inclosing said frame and levers, substantially as described.

10. The combination, in a weighing-scale, of the frame with the scale-beam pivoted therein and having the short arm 11 and the sliding counterpoise, a draw-rod connected with said short arm, an extension 27 on said short arm, an adjustable counter-balance therefor, curved levers 32 and 35, pivoted in bearings 21 and 22, a link 30, connecting the short arm of said beam and the lever 32, the weighted end of the lever 35, the friction-roller arranged thereon, the arm 49, having the arm 54 and fixed on the shaft 24, the shaft 24, provided with the quadrant gear, a pinion to engage the same, a dial and a pointer therefor fixed on the pinion-shaft, substantially as described.

11. The combination, in a weighing-scale, of the scale-beam and the draw-rod therefor, said scale-beam notched for units-weights and having the sliding counterpoise, the curved levers 32 and 35, linked to said scale-beam, the quadrant arranged to be operated by the movement of the lever 35, the pinion engaging said quadrant, the scoop-frame pivoted on the end of the lever 32, the dial provided with two sets of marks, the pointer arranged thereon and connected with said pinion, and said pointer provided with the end 68, adapted to move over the second set of marks on said dial, and a case inclosing said levers, substantially as described.

In testimony whereof I have hereunto set my hand this 25th day of November, 1891.

NILS NILSON.

In presence of—
C. G. HAWLEY,
F. S. LYON.